United States Patent [19]

Clark et al.

[11] 3,999,870
[45] Dec. 28, 1976

[54] PRELOADED BALL JOINT WITH INTEGRATED GREASE FITTING

[75] Inventors: Herbert D. Clark, Kettering; Thomas R. Kushmall, Springfield; Richard A. Merrifield, Spring Valley; Stanley E. Smith, Dayton, all of Ohio

[73] Assignee: General Motors Corporation, Detroit, Mich.

[22] Filed: May 10, 1976

[21] Appl. No.: 684,747

[52] U.S. Cl. .............................. 403/36; 403/132; 403/40; 184/105 B
[51] Int. Cl.² ........................................ F16C 11/06
[58] Field of Search ............... 184/105 B, 105 C; 251/339; 403/27, 132, 133, 36, 40

[56] References Cited

UNITED STATES PATENTS

| | | |
|---|---|---|
| 3,813,178 | 5/1974 | Herbenar .............................. 403/27 |
| 3,890,052 | 6/1975 | Herbenar .............................. 403/36 |

FOREIGN PATENTS OR APPLICATIONS

| | | | |
|---|---|---|---|
| 277,240 | 9/1927 | United Kingdom ................. 403/36 |

*Primary Examiner*—Andrew V. Kundrat
*Attorney, Agent, or Firm*—F. J. Fodale

[57] ABSTRACT

A ball joint has an elastomeric spring for preloading the ball joint and automatic wear take-up. The elastomeric spring includes an integral conical nib which cooperates with an integral nipple portion of the housing cover to provide a grease fitting for admitting lubricant to the interior of the ball joint housing.

3 Claims, 5 Drawing Figures

PRELOADED BALL JOINT WITH INTEGRATED GREASE FITTING

This invention relates generally to ball joints and more specifically to preloaded ball joints having an elastomeric spring for preloading the ball joint and automatic wear take-up.

In the past such ball joints have incorporated conventional lubrication devices known in the trade as "Zerk" fittings. Such fittings generally comprise a discrete valve body carrying an internal spring biased ball valve closing an opening at a nipple shaped end. The other open end of the valve body is normally externally threaded and attached to a ball joint housing via a thread hole usually through the cover.

The prior art British Patent Specification 277,240 of Fritz Faudi, accepted Sept. 15, 1927 discloses a preloaded ball joint having a cover which incorporates a lubricating device in such a way that the cover itself provides the valve body. While the ball joint disclosed in the British Specification does eliminate the need for a separate valve body, the lubricating device still utilizes a ball valve and spring and requires a washer with the result that the device involves the same number of parts as a separate Zerk fitting and consequently little or no improvement from a cost standpoint.

The principle object of this invention is to provide a preloaded ball joint having an improved grease fitting from the standpoint of eliminating parts and reducing manufacturing costs.

A principle feature of this invention is that the movable valve for the grease fitting is an integral part of a unitary molded elastomeric spring which preloads the ball joint and thus is provided in a simple and exceedingly low cost manner.

Another feature of this invention is the utilization of a unitary molded body which has an elastomeric spring portion for preloading the ball joint and a valving portion which functions without the need of a separate spring.

Another feature of this invention is that the grease nipple may be formed as an integral part of the cover in which case the grease fitting consists entirely of integral portions of other ball joint parts and does not require any discrete parts.

The exact nature of this invention as well as other objects and advantages thereof will be readily apparent from consideration of the following specification relating to the annexed drawing in which.

Figure 1:
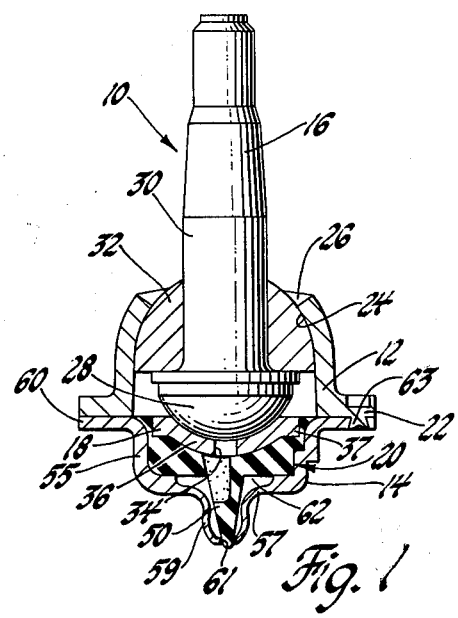
FIG. 1 is a partially sectioned elevation view of a preloaded ball joint incorporating this invention.
Figure 2:
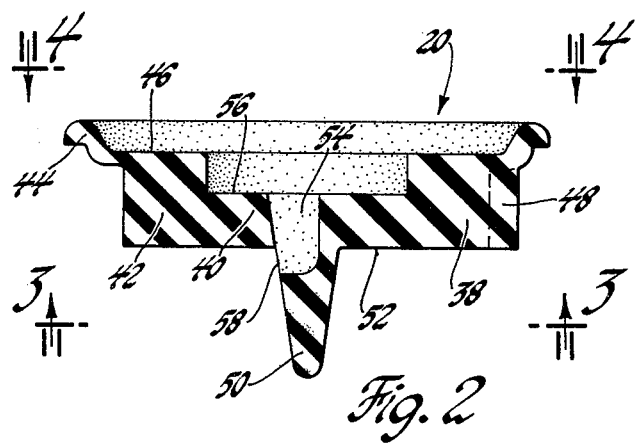
FIG. 2 is an enlarged view of the elastomeric spring shown in FIG. 1 prior to its assembly into the ball joint.
Figure 3:
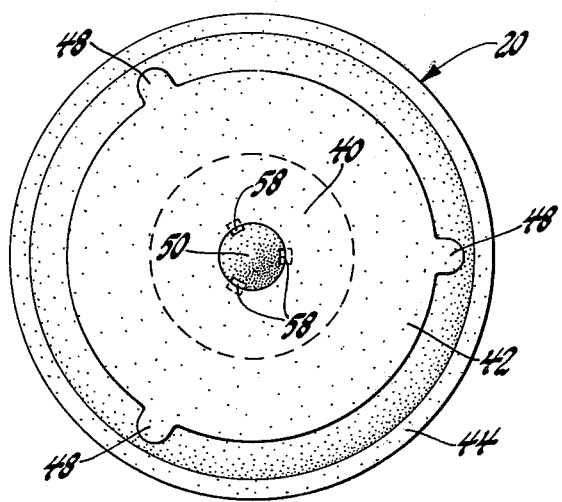
FIG. 3 is a bottom view of the elastomeric spring taken substantially along the line 3—3 of FIG. 2.
Figure 4:
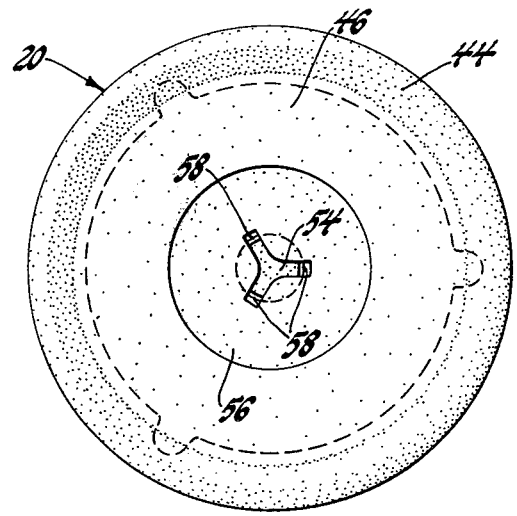
FIG. 4 is a top view of the elastomeric spring taken substantially along the line 4—4 of FIG. 2.
Figure 5:
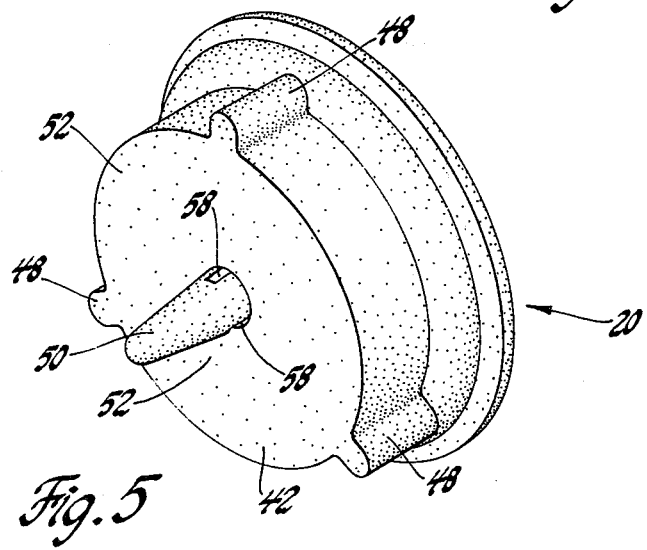
FIG. 5 is a perspective view of the elastomeric spring shown in FIGS. 2, 3 and 4.

Referring now to the drawing, FIG. 1 illustrates a ball joint 10 comprising a housing 12 and cover 14, a ball stud unit 16, a movable bearing seat 18 and an elastomeric spring 20.

The housing 12 is a die-formed part having an outward peripheral flange 22 at an open end thereof. The opposite end portion of the housing is curved inwardly forming an internal substantially partispherical fixed bearing seat 24 adjacent a reduced opening 26. The ball stud unit 16 comprises an integral head 28 and elongated stud 30 of reduced diameter which is journalled in a complementary annular head 32 which engages a shoulder at the juncture of the head 28 and the elongated stud 30. The heads 28 and 32 have outer concentric substantially partispherical surfaces and form a ball portion of the stud unit 16 which permits the stud unit 16 to rock with respect to the housing 12.

The head 32 matingly engages the fixed bearing seat 24 of the housing 12, as shown in FIG. 1. The head 28 in turn is engaged by the movable bearing seat 18 which is a case hardened stamped disc having a central hole 34 surrounded by a central dome shaped portion 36 which matingly engages the substantially partispherical surface of the head 28. Wear between the heads 28 and 32 themselves and between the heads 28 and 32 and their respective bearing seats 18 and 24 is automatically taken up in the axial direction by the elastomeric spring 20 which is compressed between the movable bearing seat 18 and the cover 14.

Referring now to FIGS. 2, 3, 4 and 5, the elastomeric spring 20 is shown in detail in its free uncompressed state prior to assembly into the ball joint shown in FIG. 1. The elastomeric spring 20 which may be molded from a grease resistant natural rubber or synthetic rubber-like material, such as neoprene, comprises a unitary molded body 38 having a central disc 40 of reduced thickness surrounded by an annulus 42 of rectangular cross section. The annulus 42 has a depending peripheral skirt 44 which flares radially outwardly and upwardly away from a flat upper end surface 46 of the annulus 42.

The annulus 42 is of uniform height or thickness in the axial direction and has three integral part cylindrical radial projections 48 which center the elastomeric spring 20 in the cover 14 and provide three arcuate lateral spaces between the cover 14 and the annulus 42. These spaces together with the central space provided by the reduced thickness of the central disc 40 accomodates expansion of the annulus 42 in the lateral or transverse direction when the annulus 42 is compressed between the bearing seat 18 and the cover 14 in the axial direction to preload the ball joint.

In assembly, the annulus 42 of the elastomeric spring 20 engages the flat peripheral portion 37 of bearing seat 18 which prevents any substantial tilting of the movable bearing seat 18 in the housing. The annulus 42 also conforms to those portions of the central dome shaped portion 36 which it engages and as the annulus 42 expands laterally responsive to compression in the axial direction the space between the elastomeric spring 20 and the bearing seat 18 is nearly filled as shown in FIG. 1.

The central disc 40 includes a concentric conical nib 50 which projects downwardly of the lower end face 52 common to the disc 40 and annulus 42. The central disc 40 has a Y-shaped cavity 54 (see FIG. 4) which extends from the recessed upper surface 56 to a location in the base portion of the conical nib 50 below the lower end face 52. Each leg of the Y-shaped cavity 54 intersects the surface of the conical nib forming three circumferentially spaced openings or inlets 58.

The cover 14 is a die formed part having a generally hat shaped cross section. The cover 14 thus comprises a cylindrical wall 55 intermediate a circular end wall 57 and an outward flange 60. The circular end wall 57 has a cupped central portion of reduced thickness which forms an integral grease nipple 59. The grease nipple 59 is formed in several progressive die forming operations on an initially flat circular end wall of uniform thickness. In the assembled position, the conical nib 50 is compressed in the axial direction and thus biasingly and sealingly engages the interior edge of the entrance hole 61 of the nipple 59. The conical nib 50 preferably sealing engages at the interior edge of the hole to maximize the column loading effect during relubrication and may have a rounded end projecting outwardly of the nipple. The interior surface of the nipple 59 is otherwise spaced from the nib 50 forming an internal chamber 62.

The cover 14 is attached to the housing 12 by securing the flange 60 to the flange 22 in any suitable manner. As illustrated in FIG. 1 the flanges are secured to each other by a plurality of extruded studs 63 (one shown) of the flange 22 which are disposed in mating holes of the flange 60 and staked. Since the housing 12 and the cover 14 are die formed parts the juncture of the flanges 22 and 60 forms an internal crevice shaped groove. In assembly, the peripheral skirt 44 of the elastomeric spring 20 is compressively received in the crevice shaped groove to seal the juncture between the flanges 22 and 60 and is also biased against the outer peripheral edge of the movable bearing seat 18 to center it.

As is evident from FIG. 1, the elastomeric spring 20, particularly the annulus 42 is under compression in the axial direction and the nib 50 is biased into engagement with the interior edge of the entrance hole 61. Under such conditions the ball joint is preloaded and the entrance hole 61 is sealed. In order to initially lubricate or relubricate the ball joint, an ordinary grease gun is fitted onto the nipple 58 and actuated. The grease under pressure from the gun forces the conical nib 50 upwardly disengaging it from the interior edge of the entrance hole 61 and grease flows into the chamber 62. The grease is then delivered to the interior of the ball joint via inlets 58, cavity 54 and hole 34. It should be noted that during lubrication the nib 50 is essentially loaded as a column. Consequently, it is desirable that the height of the portion of the conical nib which engages the nipple be maximized in the space available. To this end the nib 50 seals at the interior edge of the hole 60. It also seems desirable to provide for substantial flexibility at the base of the nib 50 which in this instance results from the Y-shaped cavity 54 extending into the base portion of the nib 50.

We wish it to be understood that we do not desire to be limited to the exact details of construction shown and described, for obvious modifications will occur to a person skilled in the art.

We claim:

1. In a preloaded ball joint having a nipple for admitting grease into the interior of the ball joint housing and an elastomeric spring within the housing acting on a movable bearing seat therein to preload the ball joint and take-up wear, the improvement comprising:
    said elastomeric spring having an integral nib biasingly engaging an interior portion of the nipple surrounding an entrance hole through the nipple, said nib being sufficiently resilient to be disengaged from said interior portion by grease under pressure applied thereagainst via said entrance hole to admit said grease into the interior of said nipple, and
    passage means through said elastomeric spring including an inlet adjacent a base of said nib.

2. In a preloaded ball joint having a nipple for admitting grease into the interior of the ball joint housing and an elastomeric spring within the housing acting on a movable bearing seat therein to preload the ball joint and take-up wear, the improvement comprising:
    said elastomeric spring having an integral conical nib protruding through an entrance hole through the nipple and biasingly engaging an interior portion of the nipple surrounding said entrance hole, said nib being sufficiently resilient to be disengaged from said interior portion by grease under pressure applied thereagainst via said entrance hole to admit grease into the interior of said nipple, and
    passage means through said elastomeric spring including a plurality of inlets intersecting said nib adjacent its base.

3. In a preloaded ball joint having a nipple for admitting grease into the interior of the ball joint housing and an elastomeric spring within the housing acting on a movable bearing seat therein to preload the ball joint and take-up wear, the improvement comprising:
    said elastomeric spring having a central disc of reduced thickness integral with an annulus, said central disc having an integral perpendicular conical nib having a rounded end which protrudes through an entrance hole through the nipple, said nib biasingly engaging interior portions of the nipple adjacent an interior edge of said entrance hole, to seal the same, said nib being sufficiently resilient to be disengaged from said interior portions by grease under pressure applied thereagainst via said entrance hole to admit grease into the interior of said nipple, and
    passage means through said elastomeric spring comprising a Y-shaped cavity extending through said central disc and intersecting said nib adjacent its base to provide three circumferentially spaced inlets.

* * * * *